(12) United States Patent
Hsu et al.

(10) Patent No.: US 6,206,764 B1
(45) Date of Patent: Mar. 27, 2001

(54) METHODS FOR MACHINING HARD MATERIALS USING ALCOHOLS

(75) Inventors: Stephen Hsu, Germantown; Tsi-Neng Ying, Silver Spring; Jia-Ming Gu, Hyattsville, all of MD (US); Yu-Shu Wang, Marshall, MI (US); Richard S. Gates, Ijamsville, MD (US)

(73) Assignee: The United States of America as represented by the Secretary of Commerce, Washington, DC (US)

( * ) Notice: Subject to any disclaimer, the term of this patent is extended or adjusted under 35 U.S.C. 154(b) by 0 days.

(21) Appl. No.: 09/060,851

(22) Filed: Apr. 16, 1998

Related U.S. Application Data

(60) Provisional application No. 60/043,259, filed on Apr. 17, 1997.

(51) Int. Cl.[7] ............... B24B 1/00; B23C 5/28; C10M 129/52; C07C 315/00
(52) U.S. Cl. ............ 451/53; 252/78.5; 409/131; 409/136; 451/450; 508/110
(58) Field of Search ............ 409/131, 132, 409/135, 136; 252/51.5 R, 49.5, 78.5; 451/56, 36, 53; 508/308, 110, 422, 282, 482, 116; 558/339; 29/DIG. 87–90, 71, 72

(56) References Cited

U.S. PATENT DOCUMENTS

| | | | |
|---|---|---|---|
| 3,676,348 | * 7/1972 | Unick et al. ............ | 508/583 |
| 3,715,312 | * 2/1973 | Teeter et al. ............ | 508/308 |
| 4,027,512 | * 6/1977 | Treat ............ | 252/49.5 X |
| 4,132,663 | * 1/1979 | Hellman et al. ............ | 44/62 |
| 4,240,916 | * 12/1980 | Rossi ............ | 558/339 |
| 4,302,349 | * 11/1981 | Kosswig et al. ............ | 568/625 |
| 4,342,658 | * 8/1982 | Tincher et al. ............ | 508/282 |
| 4,549,976 | * 10/1985 | Horodysky ............ | 508/422 |
| 5,199,960 | * 4/1993 | Farng et al. ............ | 44/351 |
| 5,274,051 | * 12/1993 | Brois et al. ............ | 525/383 |
| 5,405,545 | 4/1995 | Horodysky et al. . | |
| 5,407,601 | * 4/1995 | Furey et al. ............ | 252/51.5 A |
| 5,447,466 | 9/1995 | Wang et al. . | |
| 5,503,758 | 4/1996 | Wu et al. . | |
| 5,574,184 | 11/1996 | Wu et al. . | |
| 5,637,558 | 6/1997 | Furey et al. . | |
| 5,651,648 | * 7/1997 | Furey et al. ............ | 409/131 |

FOREIGN PATENT DOCUMENTS

| | | | |
|---|---|---|---|
| 405258294 | * 10/1993 | (JP) ............ | 451/53 |
| 06073392 | * 3/1994 | (JP) ............ | 451/53 |

OTHER PUBLICATIONS

Cost Effective Ceramic Machining Highlights (ORNL Report ORNL/M–2827, Apr. 30, 1993).

Gates, Ph. D. dissertation (Penn State University, Dec. 1993).

S. Jahanir et al. Ceramic Machining: Assessment of Current Practice and Research Needs in the United States (NIST Special Publication 834, May 1992).

(List continued on next page.)

*Primary Examiner*—William Briggs
(74) *Attorney, Agent, or Firm*—Jagtiani & Associates

(57) ABSTRACT

The present invention provides a method for machining hard materials using the machining fluids containing long chain alcohol in which the machining fluid is applied to a machining tool and then lubricates the machining of the workpiece by the machining tool and protects the machining tool during machining. The method is particularly useful when used with machining tools having a Mohs hardness of at least 9 and is most particularly useful when used with diamond machining tools.

14 Claims, 8 Drawing Sheets

OTHER PUBLICATIONS

"A Study of Mechanochemical Machining of Ceramics and the Effect on Thin Film Behavior," Office of Naval Res., No. N00014–80–C–0437–2 (1983).

Vora et al. "Mechanochemical Polishing of Silicon Nitride," *Am. Cer. Soc.*, p. C140 (1982).

Wang and Hsu (*Journal of Tribology*, Jul. 1994, vol. 116, pp. 423–429).

Yasunaga et al., "Mechanism and Application of the Mechanochemical Polishing Using Soft Powders," NBS SP 561 (1979).

Hsu, et al., "Chemically Assisted Machining of Ceramics," NIST, Apr. 1993.

Hsu, et al., "Chemically Assisted Machining of Ceramics," NIST, Dec. 1993.

* cited by examiner

FTIR SPECTRA OF DIAMOND SURFACE

METHODS FOR MACHINING HARD MATERIALS USING ALCOHOLS

RELATED APPLICATIONS

The present application is based on U.S. Provisional Patent Application No. 60/043,259 filed Apr. 17, 1997, the entire disclosure and contents of which is hereby incorporated by reference.

BACKGROUND OF THE INVENTION

1. Field of the Invention

The present invention relates generally to machining fluids and a method for machining using a machining fluid.

2. Description of the Prior Art

The intricate characteristics of hardness, toughness, wear, and corrosion resistance of advanced materials such as silicon nitrides have made them ideal candidates for high-performance structural applications. These unique properties, on the other hand, also have made them very difficult to machine. For example, their high hardness makes it necessary to use diamond tools to shape and fabricate them, and if the machining force is too high, surface cracks can render the materials unusable. Therefore, the current machining technology uses very shallow penetration depth and slow machining rate to reduce the potential of surface damage. This makes the machining process long and expensive. Tool wear of the diamond also adds to the cost. The G ratios (amount of diamond wheel wear to amount of material removed) are typically small when compared to the case of conventional machining of metals by machine tools. Accordingly, the cost of machining advanced materials has become very high, amounting to 50 to 90% of the component cost of tough materials such as silicon nitrides.

Various compounds have been employed to assist the machining of ceramics, but none of them is entirely satisfactory. For example, it has been reported that barium carbonate powders can be used to provide improved polishing of ceramics (See Yasunaga et al., "Mechanism and Application of the Mechanochemical Polishing Using Soft Powders," NBS SP 561 (1979)). Improved polishing of quartz using $Fe_3O_4$ and MgO has also been described. Vora et al. have described the use of $Fe_2O_3$ and $Fe_3O_4$ for polishing silicon nitride in "Mechanochemical Polishing of Silicon Nitride," *Am. Cer. Soc.*, p. C140 (1982), and the polishing of boron carbide by NiO or $SiO_2$ is described in "A Study of Mechanochemical Machining of Ceramics and the Effect on Thin Film Behavior," Office of Naval Res., No. N00014-80-C-0437-2 (1983). All of these processes suggest that by using their powders, some thin films on the order of 1000 Å thick are formed on the ceramic surface, and that these films can be easily removed without causing damage to the surface. These processes result in a reduction of residual surface damage and improved surface quality, but no increase in the material removal rate. In fact, many of these actually decreased the material removal rate and none of these processes provided an improved machining rate over the conventional diamond tool methods.

In attempting to modify the ceramic surface using chemicals, the reactivity of compounds with ceramics must be considered. At first, it might seem that chemicals that work for metals might work for ceramics, but there are fundamental differences in the chemical reactivity between these material classes. In general, ceramics are considered to be chemically inert, while metals are relatively reactive. This occurs because the nature of interatomic bonding is different within metals and ceramics. Metals are held together with metallic bonds, and the electrons are free to move about in the metal. Ceramics are held together by covalent or ionic bonds. Because of the nature of the bonding, ceramics are inherently inert until the bonds are disrupted. Gates in his Ph. D. dissertation (Penn State University, December 1993) has suggested that the dangling bonds of silicon are responsible for the tribochemical reactions taking place between rubbing silicon nitride surfaces. He further found that common antiwear compounds which are effective for metal are not effective in lubricating ceramics. In metals, organometallic chemistry dominates, and in ceramics, surface hydrolysis reactions dominate. Therefore, in examining different chemistries for ceramic machining, the teachings of previous patents in metal-working fluids are not applicable.

Previously, using a diamond blade cutting machine, Wang and Hsu (*Journal of Tribology*, July 1994, Vol. 116, pp. 423–429) surveyed many chemicals for silicon nitride machining. They discovered, as described in U.S. Pat. No. 5,447,466, that polyhalogenated hydrocarbons were effective in accelerating the cutting rate and at the same time, improving the surface finish of ceramics.

Even the general subject of machining ceramics is relatively new, and the physical and chemical principles involved are not well understood. The current state of the art has been summarized by S. Jahanir et al. in their survey, *Ceramic Machining: Assessment of Current Practice and Research Needs in the United States* (NIST Special Publication 834, May 1992), and also in *Cost Effective Ceramic Machining Highlights* (ORNL Report ORNL/M-2827, Apr. 30, 1993). These reports essentially state that many of the basic phenomena in ceramic machining are not understood and that current practice is primarily based on experience and trial and error. Optimization of the wheel, load, speed and the materials to be machined has not been done. The effects of the coolant (machining fluid) used during machining are also not understood.

SUMMARY OF THE INVENTION

It is one objective of the present invention to provide chemical mixtures for use with diamond tools which enable high rates of material removal without causing the deterioration of the surface finish and quality of hard materials. Silicon nitride is an illustrative material of the type which can be machined using the machining fluid of the present invention. The chemicals react with the diamond surface forming a protective layer preventing rapid oxidation and wear of the diamond tool; depending on the material being machined, they may react with the material surface forming a relatively softer reaction layer; they help to disperse the fine particles which are characteristic of such machining operations so as to prevent them from depositing on the diamond wheel and the work piece. These chemical effects can take place individually or simultaneously, depending on the operating conditions, materials, and the nature of the machining operations. Taken as a whole, these chemically assisted machining processes can increase the machining rate substantially while maintaining the same surface quality or in many instances, improving the surface quality of the machined materials.

It is another objective of the present invention to provide an improved machining method that can utilize conventional machining tools.

In one embodiment, the present invention provides a method for machining difficult to machine materials using a machining fluid including a long chain alcohol in which the machining fluid is applied to a machining tool prior to the tool being used to machine a workpiece. The machining fluid acts a lubricant for the machining process and helps protect the machining tool during machining. The method is preferably used with machining tools having a Mohs hardness of at least 9 and most preferably with diamond machining tools.

DRAWING FIGURES

DETAILED DESCRIPTION OF THE PREFERRED EMBODIMENT

Definitions

Figure 1:
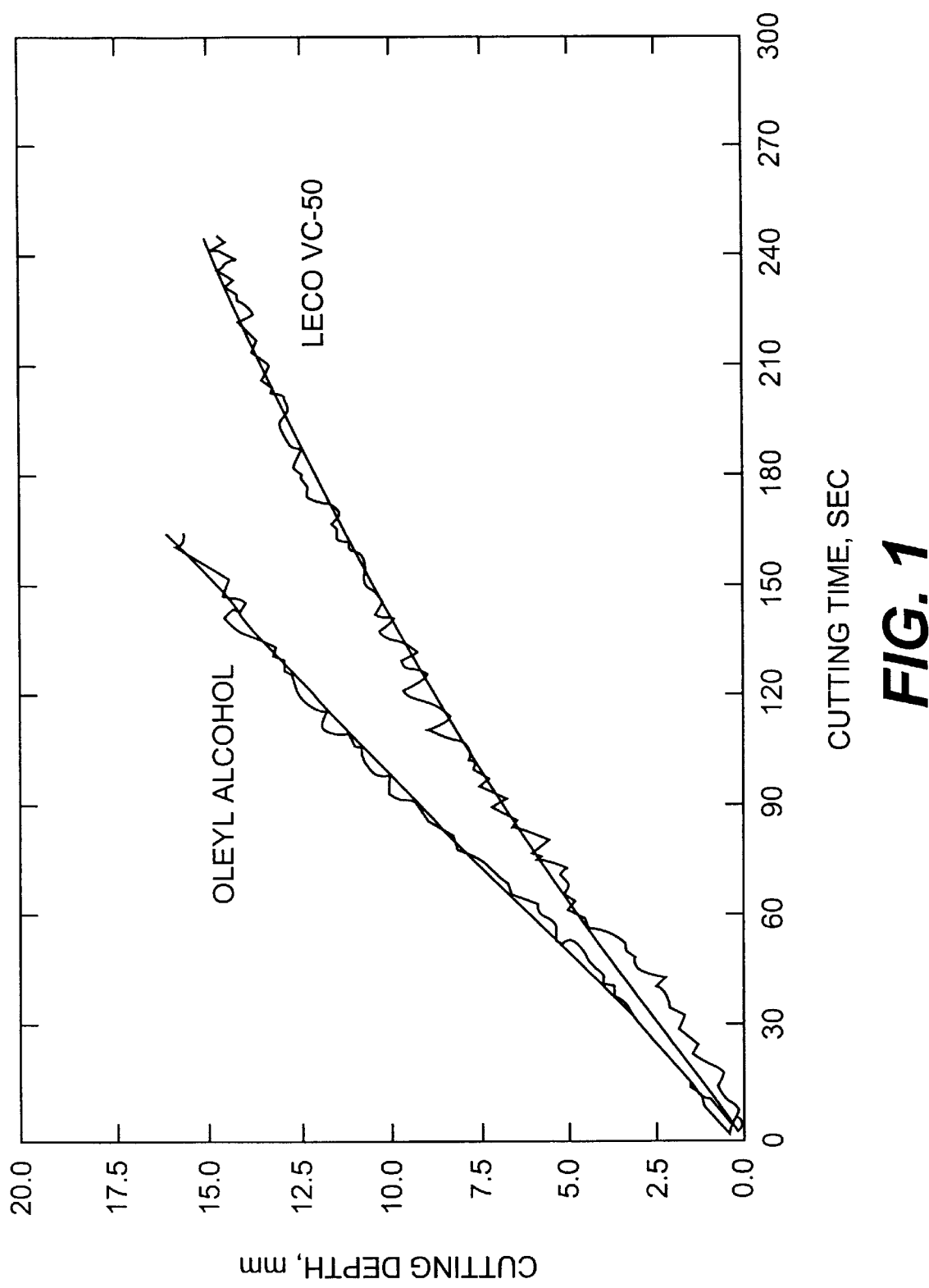
FIG. 1 is a graph comparing two cutting curves for an oleyl alcohol machining fluid of the invention (tech. 65%) with a commercially available machining fluid, LECO VC-50.

For the purposes of the present invention, the term "machining" includes all types of machining or grinding of a work piece by a grinding wheel, cutting wheel, polishing wheel, drill, milller, etc.

For the purposes of the present invention, the term "diamond machining tool" refers to tools made from diamond or having a component made from diamond.

For the purposes of the present invention, the term "long chain alcohols" includes alcohols having a carbon chain length of at least 16 carbons. These alcohols may be branched or unbranched, saturated or unsaturated, and may contain other functional groups such as halide groups, keto groups, aldehyde groups, carboxy groups, etc.

For the purposes of the present invention, the term "advanced materials" refers to materials having a Mohs hardness of 9 or greater. Such materials include silicon nitride, silicon nitride and cemented tungsten carbide.

Description

The present invention provides methods for machining hard materials using machining fluids containing long chain alcohols. These fluids can be utilized as chemical agents in rapid machining of advanced materials to improve the material removal rate and reduce the cost of machining, particularly when used with grinding or machining tools having a Mohs hardness of 9 or greater such as boron carbide tools and most particularly when used with diamond machining tools. The machining fluids act as a lubricant, a coolant and an antioxidant for the diamond machining tool. Thus, these machining fluids greatly improve the effectiveness of the machining process of advanced materials and reduce the cost of advanced materials part production. These machining fluids, when used, do not cause any deterioration of surface quality of the machined work piece, and, in fact, in many cases, actually provide a significant improvement in surface finish over prior methods. A preferred long chain alcohol is oleyl alcohol.

This technology of the present invention can be applied to machining of numerous types of advanced materials and is particularly useful when diamond tools are required. The present invention is particularly useful in machining advanced materials such as silicon nitride, silicon carbide, and cemented tungsten carbide. The machining fluid of the present invention is also particularly useful in diamond abrasive machining of other advanced materials having a Mohs hardness of 9 or greater. The machining fluids are especially useful for manufacturing advanced material parts requiring high precision such as engine parts, ball bearings, gears and seals.

The machining fluids of the present invention can be used in connection with any conventional hard abrasive machine tools for machining advanced materials without the need of additional apparatus. Examples of these machining tools include such tools as grinding wheels, cutting wheels, polishing wheels, drills, millers, etc. By employing the machining fluids of the present invention, significant advantages can be realized over conventional processes. These advantages include providing a faster machining rate, producing a machined ceramic having equal or better surface quality than now available, and lengthening the lifetime of tools.

The machining fluid of the present invention can be applied onto the contact interface between the machining tools and the advanced material to be machined through any suitable pathway, e.g., spraying, immersion, drop feeding, injection, or coating. The fluid can be applied directly onto the contact interface during machining or can also be applied to the advanced material surface prior to washing.

The machining fluids of the present invention are able to protect diamond grit used in machining from rapid oxidation and wear due to tribochemical reactions with the work piece being machined. The machining fluids react with the diamond surface to form a protective layer preventing rapid oxidation and wear. They may also react with the surface of the work piece to form a relatively softer reaction layer and help to disperse the fine particles which are characteristic of such machining operation so as to prevent them from depositing on the diamond abrasive or the work piece.

Figure 7:
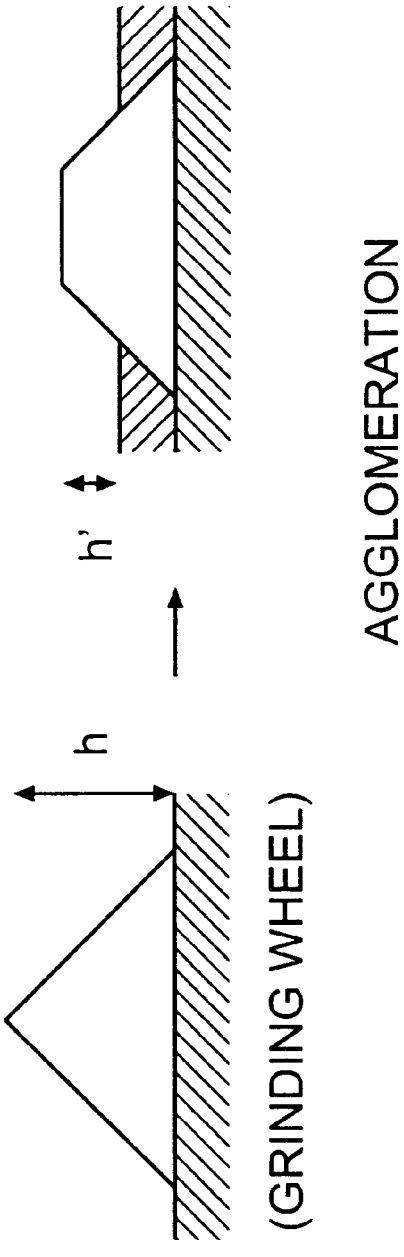
FIG. 7 is a schematic drawing depicting the effect of diamond wear and debris particle agglomeration on diamond grinding of silicon nitride.
Figure 8A:
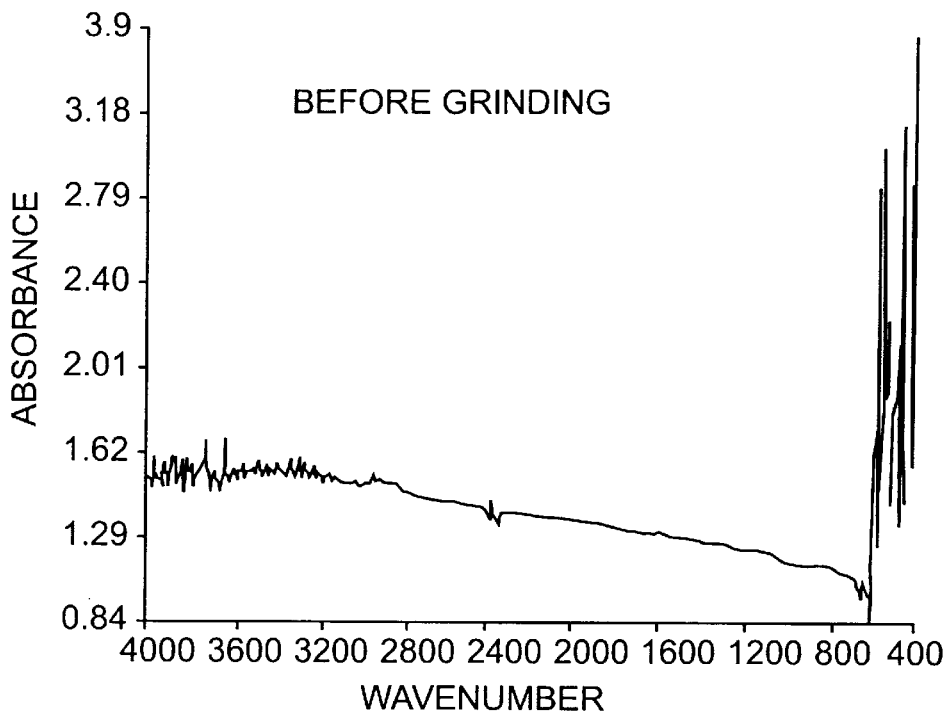
FIG. 8A is an infrared spectrum of a diamond surface before being used to grind silicon nitride.
Figure 8B:
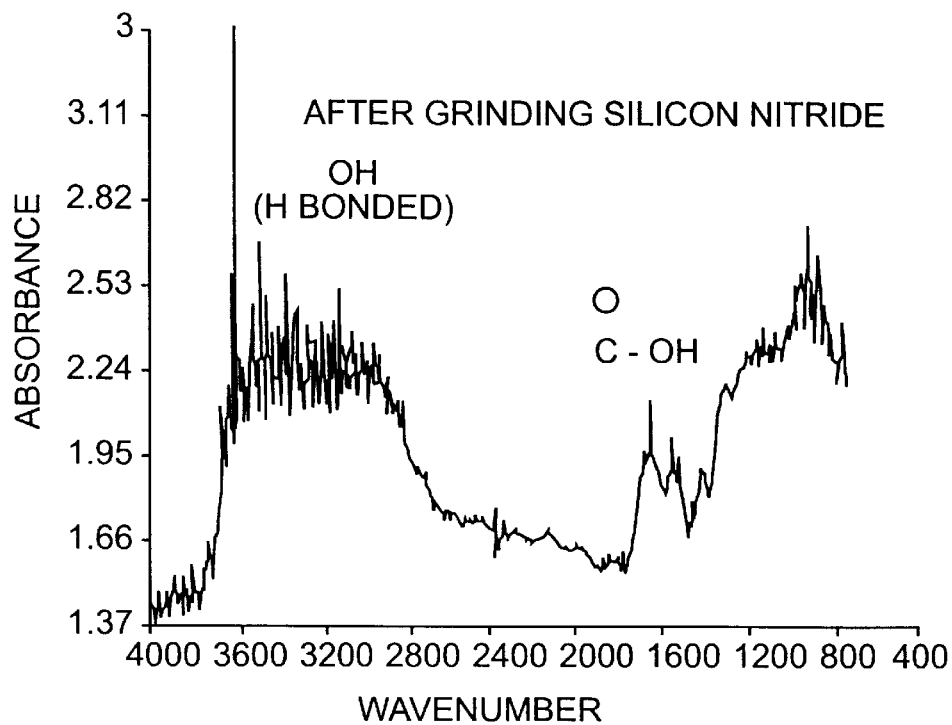
FIG. 8B is an infrared spectrum of a diamond surface after being used to grind silicon nitride in the presence of water.

The exact nature of the chemical reactions and the exact mechanisms of how these chemicals work in the machining process are not fully understood at this time; however, there are several possible explanations for the observed effects. FIG. 7 demonstrates one key mechanism which causes reduced machining rates: the rapid dulling of the diamond tips. It has been observed that in the machining process, the diamond tips quickly become dull and smooth. This is thought to occur because of the high surface temperatures which exist in the contact region, and because diamond is oxidized in the presence of oxygen and water to form a softer film which is subsequently removed by the workpiece being machined. Fourier transform infrared (FTIR) spectroscopy of the diamond surface after grinding silicon nitride in the presence of water indicates the presence of C—O surface species (FIGS. 8A and 8B), supporting the contention that the diamond has become oxidized during grinding.

In contrast, the organic coolants of the present invention chemically protect the diamonds on a diamond wheel to reduce their degradation so that they remain sharp longer. They may function by limiting oxidation of the diamond by air and/or water. Therefore, one advantage of the machining fluid of the present invention is that it can be used to allow a diamond tool to remain effective longer between dressings and that it can be used to enhance the lifetime of a tool.

The invention will now be described by way of example. The following examples are illustrative and are not meant to limit the scope of the invention which is set forth by the appointed claims.

EXAMPLE 1

To evaluate the performance of different formulated fluids, cutting tests were conducted on a modified diamond blade cutting machine, Vari/Cut™ VC-50 by LECO Corp. The tests proceeded with a 127 mm×0.356 mm (5"×0.014") metal-bonded diamond wheel rotating against and cutting either a 16.5 mm×16.5 mm×4.6 mm silicon nitride flat supplied by Kennametal or a 6.35 mm diameter rod (with designation of NBC100) from Norton, at room temperature. The rotating speed of the wheel was 500 rpm (3.3 m/s) and the chosen normal loads (7 Newtons for flat cutting and 5 Newtons for rod cutting) were calibrated using a set of dead weights. The usual coolant reservoir was replaced by a plastic bag. This allowed for use of a new bag for each test and avoided cross contamination of chemicals from test to test. Prior to each test, the diamond wheel was dressed by a dressing stone for consistent initial cutting condition, followed by a thorough cleaning in an ultrasonic bath with a sequence of solutions: hexane, acetone, conventional detergent in deionized water, deionized water. The wheel was then dried under a stream of nitrogen gas. The combination of speed and load conditions was well-matched with a light-duty cutting condition and gave a good test repeatability. The average material removal rate was determined by the period of time required to cut through the specimens. The instantaneous material removal rate was also continuously measured using a displacement transducer attached on the loading arm and recorded by a data acquisition system controlled by a computer.

The first set of tests, cutting through silicon nitride rods, provided direct comparisons between different fluids, based on the total time required for the diamond blade to cut entirely through the sample. Table 1 below summarizes the results of silicon nitride rod cutting in some organic and aqueous-based fluids.

TABLE 1

Selected results of $Si_3N_4$ rod (NBD 100) cutting at 5 N load

| FLUID TYPE | CHEMICALS | CUTTING TIME (sec.) |
|---|---|---|
| Aqueous | deionized water | 4823 |
| Aqueous | Meqquem (3%) (commercial) | 5016 |
| Organic | LECO VC-50 (commercial) | 1041 |
| Organic | oleyl alcohol (65% tech.) [4 tests] | 405 ± 92 |
| Organic | 90% oleyl alcohol 10% mineral spirits | 304 |

The results include tests on commercial organic fluid (LECO VC-50 napthenic oil recommended by the manufacturer for use with the diamond saw used in the tests) and aqueous (Meqquem COB) fluid. Under a relatively light normal loading and varied contact area condition like this, the fluids of the present invention have a cutting rate 2 to 10 times higher than these commercially available fluids. The commercial (3% Meqquem COB) coolant cuts through the $Si_3N_4$ rod in about the same time as plain water (~5000 seconds). In general, the cutting rate in aqueous solutions is lower than in organic fluids. The commercial organic (Leco VC-50) fluid cuts through the sample in about 1000 seconds. The oleyl alcohol (OA) fluid cuts through the in about half that time (400 seconds). When a mineral spirit diluent is added, the cutting rate remains low, indicating the ability to blend the OA with light mineral oils and maintain effectiveness.

Tests conducted on rod specimens allow for the comparison of overall average cutting rates for different fluids; however, the surface area exposed to the diamond blade changes with time. This makes its difficult to compare instantaneous cutting rates as a function of time for different fluids. The ability to measure the instantaneous cutting rate is important, because experience with cutting silicon nitride rods has suggested that cutting rates deteriorates differently with different fluids. In the case of the silicon nitride flat specimens, the surface exposed to the cutting blade is constant, and additional parameters such as instantaneous cutting rates and loss of cutting efficiency can be calculated and compared. Examples of the results achieved using the flat cutting tests with organic based coolant formulations are shown in FIG. 1. The oleyl alcohol has a slightly higher initial cutting rate. Furthermore, after several seconds, the commercial coolant (LECO VC-50) shows significant reduction in cutting rate, while the machining fluid of the present invention (oleyl alcohol) shows a much smaller decrease in cutting rate. As a result of cutting rate reduction, the commercial fluid takes about twice as long to cut through the same. The loss of cutting efficiency can be calculate according to the following formula:

$$\text{Loss of efficiency (\%)} = \frac{(\text{initial rate} - \text{steady state rate})}{\text{initial rate}} \times 100$$

Both the initial rate and the steady state rate are measured from the curve of cutting depth as a function of time as shown in FIG. 1.

EXAMPLE 2

Figure 2:
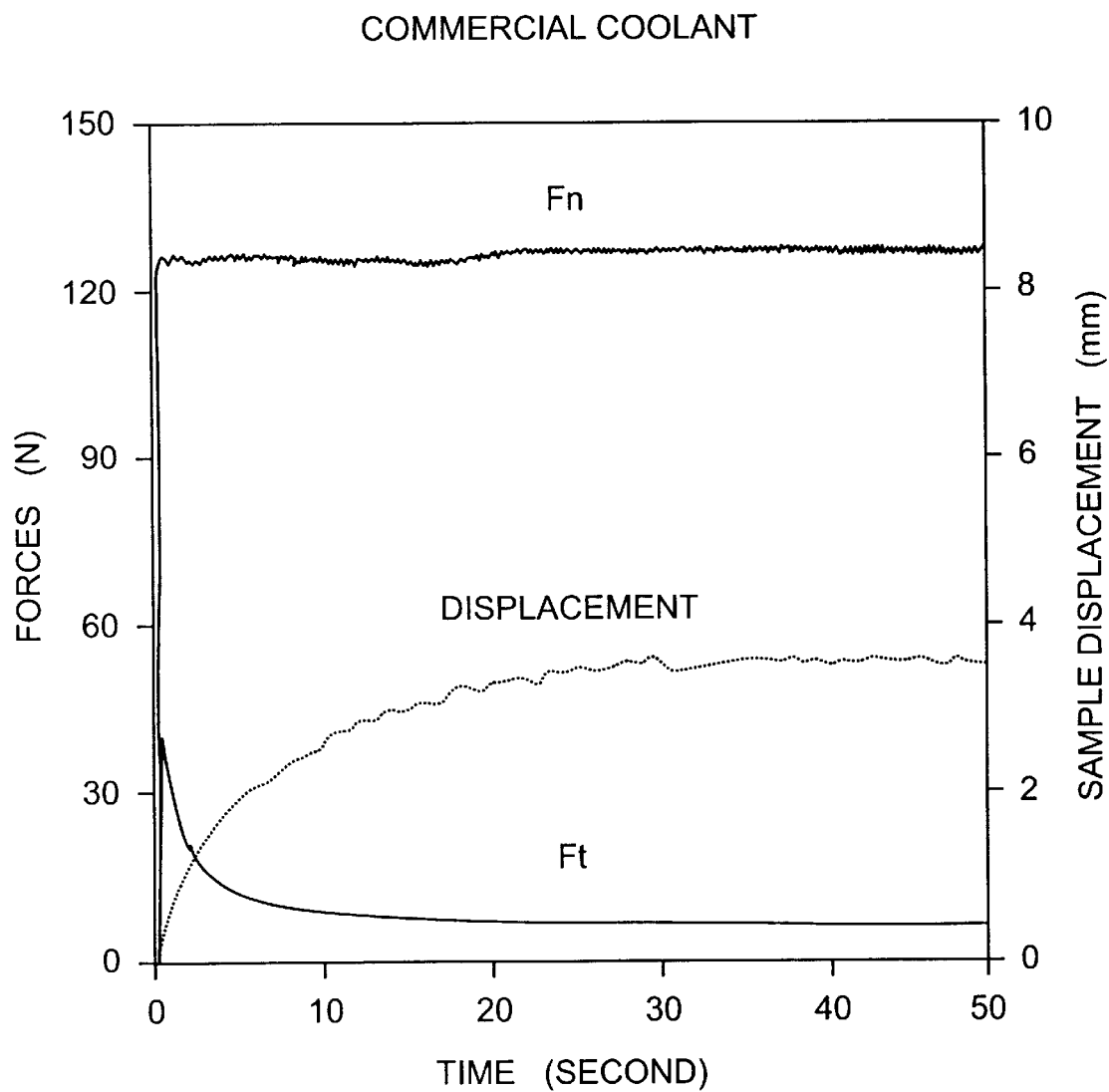
FIG. 2 is a graph showing vertical grinder data for silicon nitride ceramic using a commercial coolant.

In order to confirm the usefulness of the machining in real grinding operations, additional tests were conducted using commercial surface grinders instrumented to measure grinding rates and forces acting on the surface during actual grinding operations. A vertical grinder was used to compare the performance of the machining fluids of the present invention and commercial fluids in grinding silicon nitride. Grinding rate was measured as a displacement as material was ground away from a sample. An example of grinding silicon nitride using a commercial fluid (3% Meqquem in water) is shown in FIG. 2, where $F_t$ is the tangential force exerted on the workpiece and $F_n$ is the normal force exerted on the workpiece.

Figure 3:
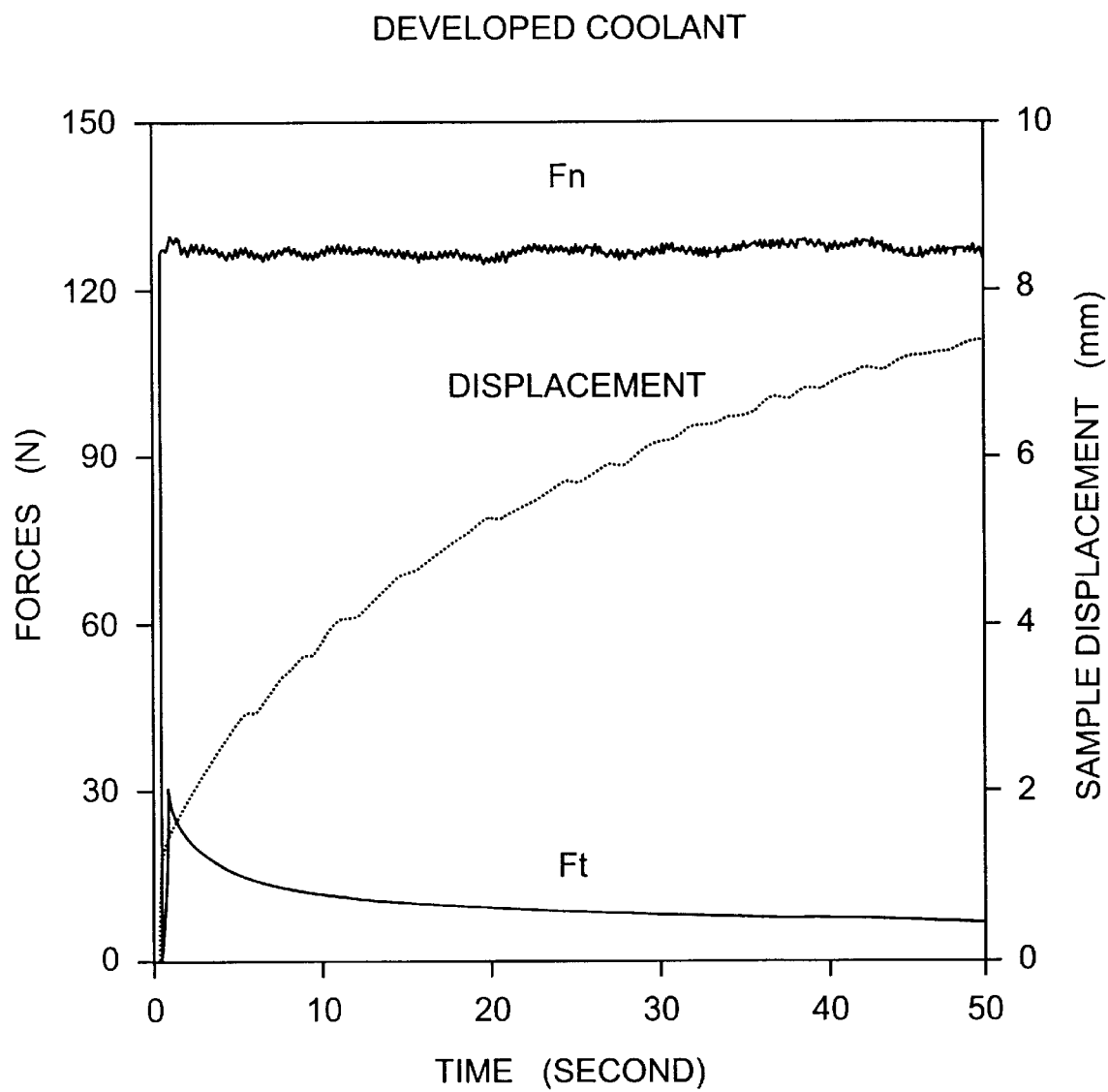
FIG. 3 is a graph showing vertical grinder data for silicon nitride ceramic using a machining fluid of the present invention.

After about twenty or thirty seconds, the sample grinding rate has been reduced to very low levels. In contrast, the machining fluid of the present invention, a mixture of oleyl alcohol and a light diluent oil (octadecene), has a higher grinding rate throughout the test, as shown in FIG. 3, confirming the trends observed earlier with the cutting tests.

Figure 4:
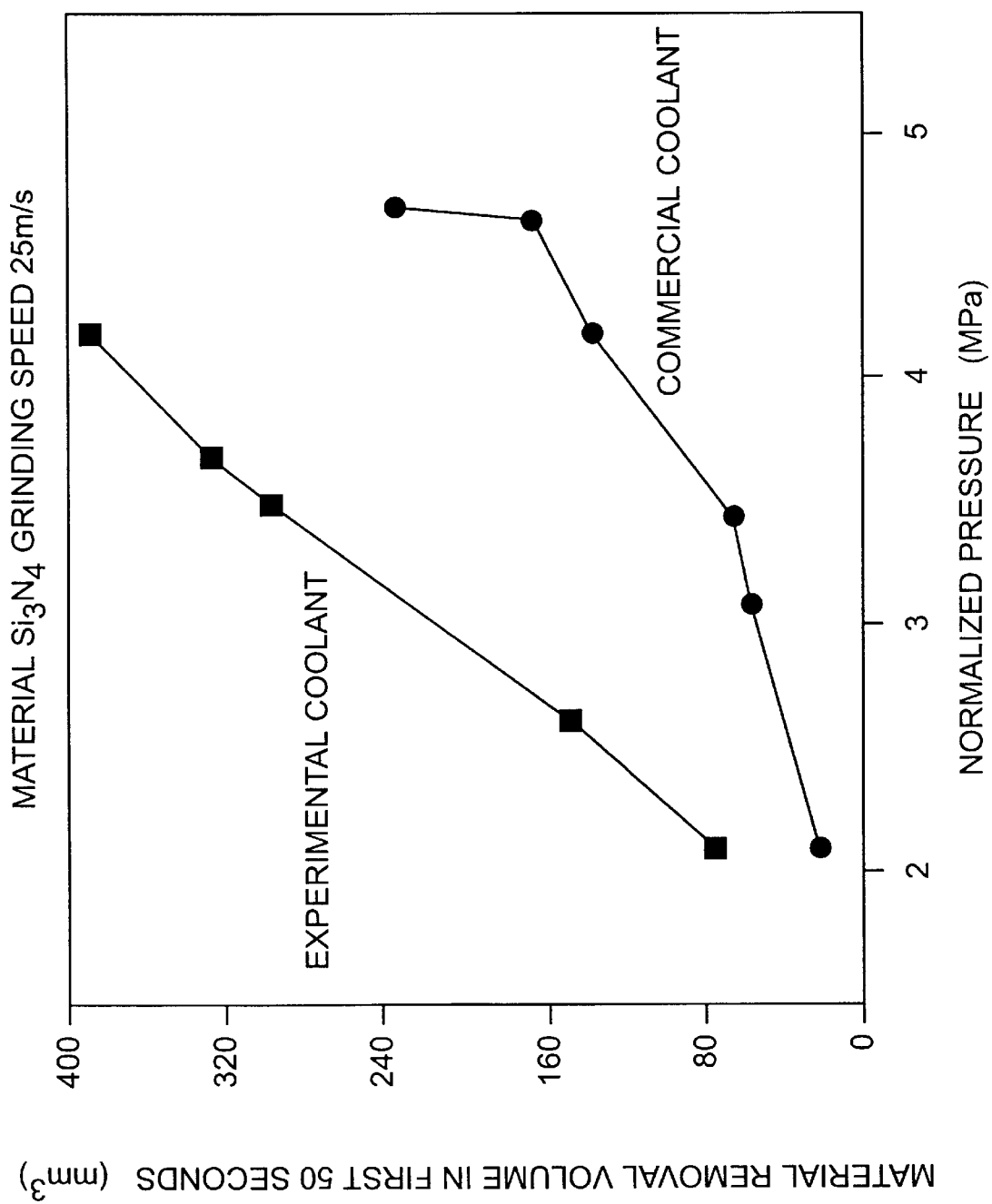
FIG. 4 is a graph comparing material removal as function of operation load for a machining fluid of the present invention and commercial coolants.
Figure 5:
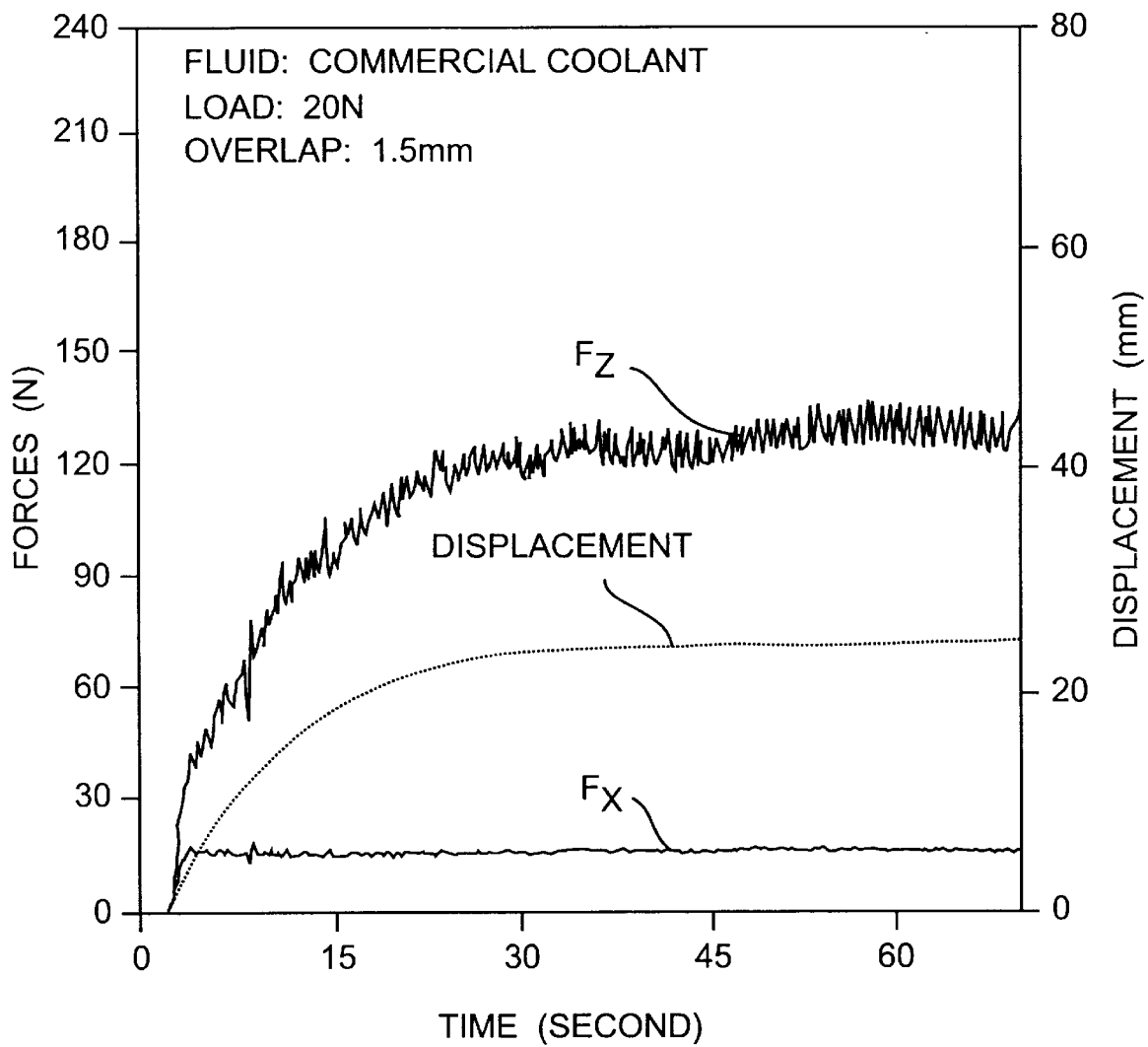
FIG. 5 is a graph showing surface grinder data for silicon nitride ceramic using a commercial coolant.
Figure 6:
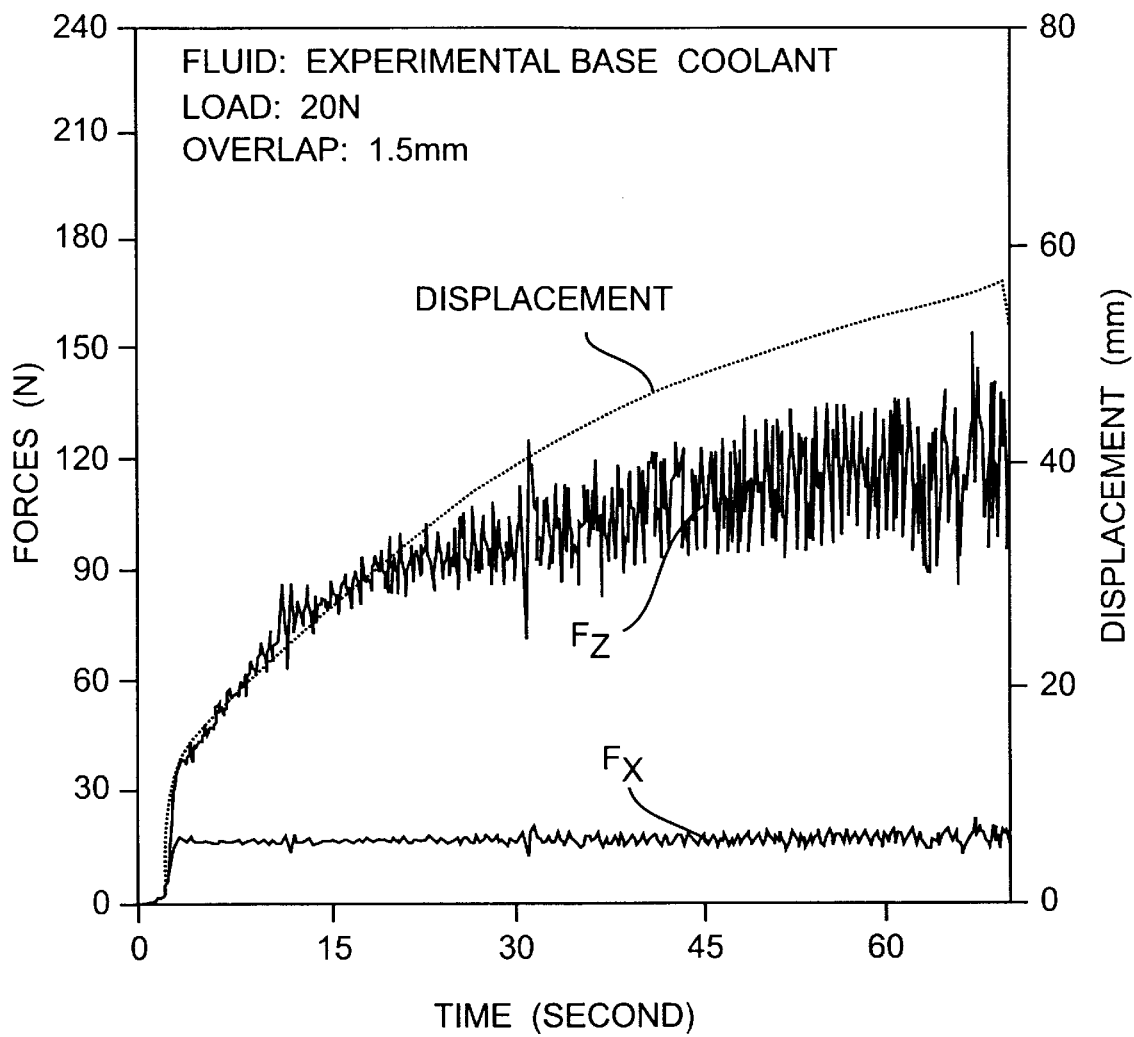
FIG. 6 is a graph showing surface grinder data for silicon nitride ceramic using a machining fluid of the present invention.

A comparison of material removal volumes for fixed duration tests, shown in FIG. 4, indicates the superiority of the machining fluid of the present invention throughout the range of applied loads used. Vertical grinder test using a mixture of oleyl alcohol and octadecene indicated that grinding rates could be further improved (~30 to 50%) with the addition of 3% of a long chain 1,2 diol such as 1,2-tetradecanediol. Grinding tests were also conducted using a surface grinder apparatus, with similar results shown in FIGS. 5 and 6, where $F_x$ is the tangential force (force in the x direction) exerted on the workpiece and $F_z$ is the normal force (force in the z direction) exerted on the workpiece.

The experimental fluid in these tests consisted of 49% OA, 49% octadecene, and 2% 1,2-tetradecanediol.

EXAMPLE 3

In actual use, commercial grinding fluids are required to have other desirable, practical properties including low biological activity (bacteria and fungi) and low corrosion potential. A machining fluid of the invention has been tested consisting of 48.5% oleyl alcohol, 2% 1,2-tetradecanediol, 1% corrosion inhibitor (Irgamet 39), 0.05% biocide (Nipacide BIT-20), and 0.1% anti-misting additive (Exxon L-80 polyisobutylene), with the remainder of the machining fluid being octadecene (an organic diluent). This formulation provided enhanced grinding rates similar to that seen for neat OA.

EXAMPLE 4

It is sometimes industry practice to be able to grind multiple types of advanced materials, for example, both silicon nitride and cemented tungsten carbide (WC), using a single type of coolant. It would not be practical in this type of operation to have to change coolants. Therefore, the machining fluid of the invention was examined for its ability to be used in the grinding of cemented WC materials. Tests were conducted to compare the diamond grinding of WC using the invention's machining fluid and a commercial coolant. A vertical grinder was fitted with a metal-bonded diamond grinding wheel and samples of cemented tungsten carbide were ground under a standard set of test conditions of 40 N load, and 25 m/s. There results are summarized in Table 3 below:

TABLE 3

Grinder Tests on Cemented WC

| Fluid | Material Removed (mm$^3$) |
| --- | --- |
| Commercial Coolant [3% Meqquem COB] | 240 |
| Experimental Coolant [48.5% OA, 48.5% octadecene, 2% tetradecanediol, 1% Irgamet 39] | 318 |

Conditions: Vertical grinder, metal-bonded diamond wheel, 25 m/s, 40 N load, 60 seconds The commercial coolant (3% Meqquem COB) ground away 240 mm$^3$ cemented WC during the test. In the same amount of time, the experimental fluid removed 318 mm$^3$ material, a 33% increase.

EXAMPLE 5

A 100-gallon sample of machining fluid made according to the present invention was blended and tested in an automated production grinding machine (Kenmatic Endform Grinder). Trial of the coolant was on a standard production cemented tungsten carbide insert material. This test was performed to determine if the fluid primarily functions by protecting the diamond surface. If this were true, then any operation using diamond tools could benefit. The cemented tungsten carbide represented the bulk of operations in the test plant.

The industrial grinder used for this trial was a specially designed, computer controlled, enclosed, robotic apparatus capable of grinding inserts at a rate of over a thousand pieces a day. The machine used a commercial organic coolant for its normal operation. Therefore, the first step was to drain and flush the system with 100 gallons of the base oil used in the invention coolant. This was done to reduce the possible contamination to an acceptable 0.25%.

For the operation of the machine, the operator periodically fed a rack (500 inserts) of blank insert parts for grinding to the specific dimensions. The machine had various optical sensors so that when the final dimension were reached, the machine stopped and removed the part. The time it took from beginning to finish was called the cycle time. The finished part was inspected optically under magnification to ensure dimensional conformity with set tolerances. The diamond wheel used was a 250 mm resin-bonded diamond wheel rotating at 1900 rpm (approximately 25 m/s surface speed). During operation, a stream of coolant was sprayed into the contact region between insert and diamond wheel. The grinder was especially designed to final grind three faces of a tool in a complex sequence of passes. Tests were conducted using blanks and programming for top notch threading and grooving style inserts.

The first test conducted was the cycle time test. Since the machine operated on variable power, the cycle time per piece therefore represented the material removal rate. The test result was identical to the commercial organic coolant used previously. This shows that there is no decrease in performance in cycle time.

The higher material removal rate from the invention's coolant primarily was a result of retaining the initial cutting rate without deterioration of the material removal rate. Dressing of the wheel after grinding 30 pieces of inserts was the initial dressing cycle interval. The key indicator for the need to redress the wheel was the burnt marks appearing on the ground surfaces. Redressing was also necessary to remove debris and sharpen the diamond. Since each insert had two working ends, this represented 60 individual sequences of grinding steps per piece.

The dressing interval test was conducted to compare the invention's coolant with the commercial coolant on a nearby machine which was identical to the test machine. The invention's coolant went on to finish a batch of 500 inserts without the need for redressing. Comparable interval test on the other machine yielded an average of 79 pieces with the lowest number of 40. This was how the original 30 insert dressing cycle was set.

For several days, the automatic redress cycle was set to 500 inserts without incident. This represented a significant improvement over the normal 30 insert cycle used for the commercial coolant and confirmed the results produced in laboratory tests. There are two aspects to this result that are beneficial to plant production grinding. First, since the diamond stays sharper longer, there is less overall wear of the diamond wheel and longevity is increased. Second, fewer diamond dressing steps are needed. Thus, the number of inserts that can be ground in a set amount of time can be increased.

Since initial tests were promising, the tests continued on a grinder producing normal products. As the plant trial continued, the number of inserts per dressing interval decreased gradually after two months continual operation (24 hours a day, 7 days a week operation). In the fourth month, the interval dropped to about 100 inserts per dressing cycle. This is still significantly better than the commercial coolants used previously.

At about this time, used coolant analysis indicates the disappearance of the diol in the formulation. One gallon of the diol was then added to the coolant, and, immediately, the dressing interval went up to 200. The 200 insert dressing cycle limit was preset but not exceeded.

This plant trial demonstrated that the invention's machining fluid can be safely operated under a normal industrial environment to produce commercially acceptable products. Also, the drastic reduction in dressing interval produces significant economic benefits both in terms of tool costs and high productivity.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A method for machining a ceramic workpiece comprising the steps of:

applying machining fluid comprising a long carbon chain alcohol to a diamond grinding tool, said long carbon chain alcohol having a carbon chain length of at least 16 carbons; and grinding said ceramic workpiece with said diamond grinding tool.

2. A method for machining a ceramic workpiece comprising the steps of:

applying machining fluid comprising oleyl alcohol to a diamond grinding tool, and grinding said ceramic workpiece with said diamond grinding tool.

3. A method for machining a ceramic workpiece comprising the steps of:

applying machining fluid comprising a long carbon chain alcohol to a diamond grinding wheel, said long carbon chain alcohol having a carbon chain length of at least 16 carbons; and grinding said ceramic workpiece with said diamond grinding wheel.

4. The method of claim 1, wherein said long carbon chain alcohol has a carbon chain length of at least 18 carbons.

5. The method of claim 1, wherein said long carbon chain alcohol comprises a saturated alcohol.

6. The method of claim 1, wherein said long carbon chain alcohol comprises an unsaturated alcohol.

7. The method of claim 1, wherein said long carbon chain alcohol comprises oleyl alcohol.

8. The method of claim 3, wherein said machining fluid further comprises octadecene.

9. The method of claim 8, wherein said machining fluid further comprises 1,2-tetradecanediol.

10. The method of claim 1, wherein the workpiece comprises silicon nitride.

11. The method of claim 1, further comprising the steps of removing used machining fluid from at least one of said diamond grinding tool and said ceramic workpiece and applying fresh machining fluid to at least one of said diamond grinding tool and said ceramic workpiece from which the used machining fluid has been removed.

12. The method of claim 3, wherein said long carbon chain alcohol comprises oleyl alcohol.

13. The method of claim 2, wherein said machining fluid further comprises octadecene.

14. The method of claim 13, wherein said machining fluid further comprises 1,2-tetradecanediol.

\* \* \* \* \*